United States Patent [19]

Beard et al.

[11] Patent Number: 5,138,897
[45] Date of Patent: Aug. 18, 1992

[54] CABLE ADJUSTER

[75] Inventors: Michael A. J. Beard, Southam; Graham S. Bambrook, Leamington Spa, both of England

[73] Assignee: Moprod Supra Automotive Limited, England

[21] Appl. No.: 746,004

[22] Filed: Aug. 9, 1991

Related U.S. Application Data

[63] Continuation of Ser. No. 439,486, Nov. 21, 1989, abandoned.

[30] Foreign Application Priority Data

Nov. 23, 1988 [GB] United Kingdom ............... 8827383

[51] Int. Cl.⁵ .............................................. F16C 1/10
[52] U.S. Cl. ..................... 74/501.5 R; 74/502.6; 74/502; 192/111 A
[58] Field of Search .................... 74/500.5–502.6, 74/502; 192/111 A

[56] References Cited

U.S. PATENT DOCUMENTS

| 3,958,677 | 5/1976 | Spanelis | 74/500.5 |
|---|---|---|---|
| 4,378,713 | 4/1983 | Haskell et al. | 74/501.5 R |
| 4,585,097 | 4/1986 | Severinson | 192/111 A |
| 4,651,852 | 3/1987 | Wickham et al. | 192/111 A X |
| 4,653,272 | 3/1987 | Sibeud et al. | 192/111 A |
| 4,693,137 | 9/1987 | Deligny | 192/111 A |
| 4,705,151 | 11/1987 | Leigh-Monsteven et al. | 192/111 A |
| 4,708,297 | 11/1987 | Boers | 74/500.5 |
| 4,735,298 | 4/1988 | Hauguel | 192/111 A |
| 4,753,123 | 6/1988 | Stormont | 192/111 A |
| 4,762,017 | 8/1988 | Jaksic | 192/111 A |
| 4,799,400 | 1/1989 | Pickell | 74/502.6 |

FOREIGN PATENT DOCUMENTS

| 0030494 | 6/1981 | European Pat. Off. | 192/111 A |
|---|---|---|---|
| 0194179 | 9/1986 | European Pat. Off. | 192/111 A |
| 2101209 | 7/1972 | Fed. Rep. of Germany. | |
| 3719399 | 12/1988 | Fed. Rep. of Germany | 192/111 A |
| 2553479 | 4/1985 | France. | |
| 2595841 | 9/1987 | France. | |
| 8605849 | 10/1986 | PCT Int'l Appl. | 192/111 A |
| 1379091 | 1/1975 | United Kingdom | 74/501.5 R |

Primary Examiner—Vinh T. Luong
Attorney, Agent, or Firm—Learman & McCulloch

[57] ABSTRACT

A Bowden cable adjuster is self adjusting. This comprises a starlock washer (34) having prongs engaged with a tube (26) which forms a continuation of the Bowden cable sleeve, and which locks on that tube and allows only unidirectional movement when the prongs ease contact with tube. Release member (34) is displaced to the right in the Figure by contact with for example the end of the Bowden inner wire when adjustment is necessary and its other end displaces the prongs for release. Springs (44 46) keep the parts together and provide for the movement of the tube (26) when adjustment occurs.

7 Claims, 1 Drawing Sheet

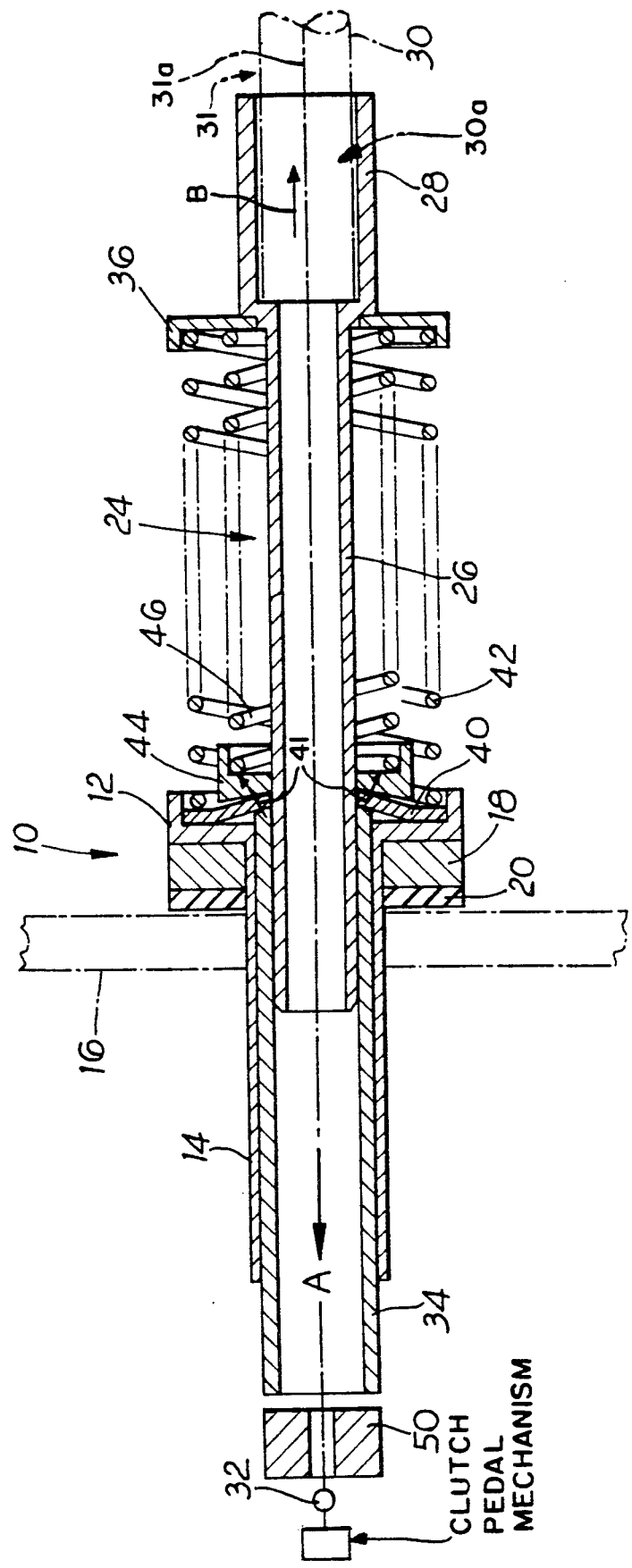

CABLE ADJUSTER

This is a continuation of copending application Ser. No. 07/439,486 filed on Nov. 21, 1989, abandoned.

FIELD OF THE INVENTION

This invention relates to adjusters for Bowden cables. A Bowden cable consists of an inner part, herein called a wire, and a surrounding tubular outer part, herein called a sleeve. Such cables are used for example for vehicle clutch operation and in those situations the sleeve is held stationery and the wire moves axially along the sleeve. The wire is connected between the clutch operating member e.g. pedal at one end and some part of the clutch mechanism at the other end. As the clutch wears, extra movement is needed. Sometimes the actual travel required for clutch operation may remain constant but the location of the wire ends becomes progressively further away from the position occupied before any wear had occurred. In either situation adjustment may be made so as to keep the operating member in the same position, by varying the relative length of the wire and sleeve or displacing one end of the sleeve to a new adjusted position.

THE PRIOR ART

In the prior art, one method of adjustment has been provided by a nipple fixed to the wire by a screw, allowing release, re-positioning of the nipple and retightening of the screw. This has the disadvantage that in order to clamp sufficiently tight it is necessary for the screw to bite into the wire which may be difficult or may damage the wire. Correct screw pressure is extremely critical.

Another prior art method is to locate one sleeve end in a screw adjuster, usually a male screwthreaded tube forming a continuation of the sleeve and engaged in a female threaded lug so as to form an end stop for the cable. A locknut fixes the position. Adjustment can be difficult if the end stop is inaccessible.

Other arrangements have provided the equivalent of a screwthread on a formation of the sleeve itself, in attempts to provide the same effect but at reduced cost.

One object of the invention is to provide improvements. Another object is to provide automatic adjustment.

SUMMARY OF THE INVENTION

According to the invention a Bowden cable adjuster comprises a tube for receiving an end of the sleeve of said cable and forming a continuation of said sleeve, a housing supporting said tube, and means permitting adjustment of the position of said tube relative to said housing, characterised in that said means permitting adjustment comprise a starlock washer supported on said housing and having prongs frictionally engaged with said tube, said prongs being inclined to the plane of the said washer so as to allow unidirectional movement only of said tube.

Also according to the invention, an automatic adjuster for a Bowden cable comprises a tube for receiving one end of the sleeve of the cable and for an extension thereof through which the wire of the cable extends, a release member surrounding said tube and having one end disposed about said tube for effecting adjustment, and the opposite end of said member located outside the tube being arranged to be contacted by a cable operating member, a housing receiving and guiding the said release member for sliding movement therein, a starlock washer supported by the housing, having prongs radially inwardly directed and inclined to an acute angle with respect to the axis of the release member, said prongs engaging the said tube, said release member having one end abutting said prongs, and spring means urging the starlock washer into the housing and urging the said tube away from the said opposite end of the said release member so as to draw the said tube through the starlock washer when the prongs are displaced by the release member which in turn is displaced by contact with the cable operating member.

DESCRIPTION OF THE DRAWINGS

One embodiment of the invention is now more particularly described with reference to the accompanying drawing wherein the sole FIGURE is a sectional elevation of an adjuster mechanism for a Bowden cable.

DETAILED DESCRIPTION OF THE INVENTION

Referring to the drawing, the part shown is intended for use as an automatic clutch adjuster for a motor vehicle. The adjuster shown comprises a housing generally indicated by the reference numeral 10 which comprises a cup 12 and a tube 14 extending concentrically of the cup and from the base thereof. This housing 10 is to be located and possibly fixed in relation to a vehicle bulkhead shown in dash lines at 16. Any required spacer 18 and washers 20 may be provided between the cup and the bulkhead in order to give a desired axial location according to circumstances.

The adjuster further comprises a locking tube generally indicated by the reference numeral 24 and which comprises a smaller diameter tubular portion 26 and a larger diameter tubular portion 28. The portion 28 is has a shouldered bore dimensioned internally to receive and abut one end 30a of the sleeve 30 of the Bowden cable 31 therein, so that the sleeve extends away generally as indicated in the chain dot line at 30. The wire 31a of the cable extends throughout the locking tube 24 and the housing 14 is connected for example by a fixed nipple to the clutch pedal mechanism in the vicinity of the reference 32 at the left hand side of the adjuster as illustrated.

The adjuster further comprises a release member 34 which is tubular, is a free sliding fit in the tube 14, and receives the smaller diameter portion 26 of the locking tube in its bore, also as a free sliding fit therein.

A spring abutment 36 is a shallow cup located on the locking tube and seating against a shoulder formed adjacent the junction of the two different diameter portions.

A starlock washer 40 is located in the cup 12 and this washer has a planar peripheral body portion provided with a series of prongs 41 projecting radially inwardly and with the tips of those prongs engaged with the locking sleeve. Hence the prongs are inclined to the plane containing the outer periphery of the body of the washer. The release member 34 has one end abutting the starlock washer adjacent the free ends of those prongs.

A pair of helical compression springs is employed, namely an outer spring 42 which encircles the locking tube 24 and seats on the spring abutment cup 36 at one end and the outer periphery of the starlock washer at the other end, and this spring 42 serves to retain the starlock washer in the housing.

A loose abutment washer 44 is located on the locking sleeve and has a frusto conical face of wider angle than the cone of the starlock washer adjacent the starlock washer and its opposite face forms a cup to receive and seat one end of the inner spring 46 which also encircles the locking tube 24. The opposite end of that spring also seats on the spring abutment cup 36. The washer 44 abuts the ends of the prongs adjacent to the locking sleeve so that those prongs are in effect trapped between the washer and the release member at their tips.

A spacer washer such as 50 may be located on the wire 31a and between the nipple on the wire and the release member, or the part 50 may be considered to be the actual clutch actuating part itself, fixed to the wire e.g. by a nipple 32 (shown schematically), and.

When installed, the parts are adjusted so that with the clutch engaged the nipple (or clutch actuating member) in the position 32 contacts the spacer 50 which contacts the end of the release sleeve. When the clutch is operated, that is disengaged, the wire moves in the direction of the arrow A applying a compressive load to the Bowden sleeve 30. Any tendency for the locking tube 26 to slide in the release member 34 in the direction is resisted by the starlock washer and the tips of the prongs which frictionally engage the part 26.

During wear on the clutch the clutch end of the wire, i.e. the opposite end of the wire to the point 32 moves progressively away from the adjuster, so that increasing pressure is applied on the adjuster sleeve 34 until the right hand end of the same (in the drawing) displaces the prongs to ease their frictional engagement to enable the springs 42, 46 to displace the locking sleeve so as to draw it through the starlock washer in the direction B effectively lengthening the Bowden sleeve which has the same effect as shifting the point 32 away from the adjuster again so as to reduce the load applied to the starlock washer allowing the prongs to grip and lock the adjuster in the new position. The inclination of the prongs makes the possible movement of the locking tube in the direction B unidirectional that is, the tube is prevented from moving in direction A.

Hence the adjuster of the present invention provides automatic self-adjustment of the Bowden cable. In ordinary use of a clutch the wear rate is expected to be low and each adjustment may be over a relatively small distance.

Having now described our invention what we claim is:

1. An adjuster for a Bowden cable having a sleeve and a wire movable within said sleeve, a portion of said wire extending beyond one end of said sleeve, said adjuster comprising a locking tube having a bore of such dimension as to accommodate said extending portion of said wire and said one end of said sleeve; a housing within which said locking tube is slideably accommodated; a starlock washer carried by said housing and encircling said locking tube, said washer having a plane body portion from which flexible prongs extend at an inclination to the plane of said body portion, said prongs having tips in frictional engagement with said locking tube which enable sliding movement of said locking tube in one direction relative to said housing and disable sliding movement of said locking tube in the opposite direction relative to said housing; biasing means acting on said washer at one side thereof and maintaining said washer in fixed position relative to said housing and said prongs in engagement with said locking tube; and release means at the opposite side of said washer and engageable with said prongs for disengaging the tips of said prongs from said locking tube to enable sliding movement of said locking tube in said opposite direction relative to said housing, said tube having an abutment spaced from said housing and said biasing means comprising a helical spring encircling said tube and having one end thereof seated on said abutment and exerting via its other end a force against said prongs.

2. The adjuster according to claim 1 including a second helical spring encircling said tube and having one end thereof seated on said abutment and its other end bearing against the body portion of said washer.

3. The adjuster according to claim 1 including a washer slideable on said tube and interposed between said prongs and said other end of said spring.

4. The adjuster according to claim 1 wherein said release means comprises a tubular member slideably accommodated in said housing and slideably accommodating said locking tube.

5. An adjuster for a Bowden cable having a sleeve and a wire movable longitudinally within said sleeve, a portion of said wire extending beyond one end of said sleeve, said adjuster comprising a locking tube having a bore of such dimension as to accommodate said portion of said wire and said one end of said sleeve; a housing within which said locking tube is slideably accommodated; a starlock washer carried by said housing and encircling said locking tube, said washer having a peripheral plane body portion from which flexible prong extend radially inward at an inclination to the plane of said body portion, said prongs having tips in frictional engagement with said locking tube which enable sliding movement of said locking tube in one direction relative to said housing and disable sliding movement of said locking tube in the opposite direction relative to said housing; first biasing means reacting between said locking tube and said washer to maintain the latter in fixed position relative to said housing; second biasing means independent of said first biasing means reacting between said locking tube and said prongs for yieldably maintaining said tips in engagement with said locking tube; and release means engageable with said prongs to disengage said tips from said locking tube, thereby enabling sliding movement of said locking tube in said opposite direction relative to said housing.

6. The adjuster according to claim 5 wherein said release means comprises a tubular member slideably accommodated in said housing and slideably accommodating said locking tube, said tubular member having one end thereof engageable with said prongs.

7. The adjuster according to claim 6 wherein said tubular member extends beyond said housing, thereby enabling operation of said release means externally of said housing.

* * * * *

UNITED STATES PATENT AND TRADEMARK OFFICE
CERTIFICATE OF CORRECTION

PATENT NO. : 5,138,897

DATED : August 18, 1992

INVENTOR(S) : Michael A. J. Beard and Graham S. Bambrook

It is certified that error appears in the above-identified patent and that said Letters Patent is hereby corrected as shown below:

On the Title page, item [57]
Please substitute the following Abstract of the Disclosure for the printed Abstract:

-- A Bowden cable adjuster has a locking tube abutting one end of the Bowden cable sleeve and through which the Bowden cable wire projects. A housing slideably accommodates the locking tube and carries a starlock washer having prongs which engage the locking tube and enable movement thereof relative to the housing in one direction only. A release member movably supported by the housing is engageable with the prongs to disengage them from the locking tube, thereby enabling the latter to move in each of two opposite directions. --

Column 2, line 37, cancel "is"; line 43, after "housing" insert -- tube --.

Column 3, line 15, cancel ", and"; line 23, after "direction" insert -- B --.

UNITED STATES PATENT AND TRADEMARK OFFICE
CERTIFICATE OF CORRECTION

PATENT NO. : 5,138,897
DATED : August 18, 1992
INVENTOR(S) : Michael A. J. Beard and Graham S. Bambrook It is certified that error appears in the above-identified patent and that said Letters Patent is hereby corrected as shown below:

Column 4, line 36, change "prong" to -- prongs --.

Signed and Sealed this

Ninth Day of November, 1993

*Attest:*

BRUCE LEHMAN

*Attesting Officer*    *Commissioner of Patents and Trademarks*